(12) United States Patent
Mellet et al.

(10) Patent No.: US 9,074,663 B2
(45) Date of Patent: Jul. 7, 2015

(54) MULTI-SPEED TRANSMISSION

(71) Applicant: GM Global Technology Operations LLC, Detroit, MI (US)

(72) Inventors: Edward W. Mellet, Rochester Hills, MI (US); Scott H. Wittkopp, Ypsilanti, MI (US); James M. Hart, Belleville, MI (US); Andrew W. Phillips, Rochester, MI (US)

(73) Assignee: GM GLOBAL TECHNOLOGY OPERATIONS, LLC, Detroit, MI (US)

( * ) Notice: Subject to any disclaimer, the term of this patent is extended or adjusted under 35 U.S.C. 154(b) by 104 days.

(21) Appl. No.: 13/902,071

(22) Filed: May 24, 2013

(65) Prior Publication Data

US 2013/0260944 A1 Oct. 3, 2013

Related U.S. Application Data

(62) Division of application No. 12/880,928, filed on Sep. 13, 2010, now Pat. No. 8,512,196.

(51) Int. Cl.
*F16H 3/62* (2006.01)
*F16H 3/66* (2006.01)
*F16H 3/44* (2006.01)

(52) U.S. Cl.
CPC .. *F16H 3/62* (2013.01); *F16H 3/66* (2013.01); *F16H 2003/442* (2013.01); *F16H 2003/445* (2013.01); *F16H 2200/006* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

| 4,683,776 | A | 8/1987 | Klemen |
|---|---|---|---|
| 6,558,287 | B2 | 5/2003 | Hayabuchi et al. |
| 7,101,305 | B2 | 9/2006 | Tabata et al. |
| 7,163,484 | B2 | 1/2007 | Klemen |
| 2005/0090362 | A1 | 4/2005 | Abe et al. |
| 2006/0270513 | A1 | 11/2006 | Klemen |
| 2006/0270516 | A1 | 11/2006 | Klemen |
| 2008/0020890 | A1 | 1/2008 | Shim |
| 2008/0248913 | A1 | 10/2008 | Kato et al. |

*Primary Examiner* — Erin D Bishop

(57) ABSTRACT

A transmission includes an input and output member, four planetary gear sets each having first, second and third members, five interconnecting members continuously interconnecting members of the four planetary gear sets and six torque transmitting mechanisms selectively engageable to interconnect one of the first members, second members, and third members with at least one of another of the first members, second members, third members, and a stationary member. The torque transmitting mechanisms are selectively engageable in combinations of at least three to establish at least eight forward speed ratios and at least one reverse speed ratio between the input member and the output member.

22 Claims, 11 Drawing Sheets

| GEAR STATE | Torque Transmitting Mechanisms | | | | | |
|---|---|---|---|---|---|---|
| | 24 | 26 | 28 | 30 | 32 | 34 |
| R | X | | X | | X | |
| N | | | | | | |
| 1 | X | | X | X | | |
| 2 | | X | X | X | | |
| 3 | | | X | X | X | |
| 4 | | | X | X | | X |
| 5 | | | | X | X | X |
| 6 | | X | | X | | X |
| 7 | X | | | X | | X |
| 8 | X | X | | | | X |

| GEAR STATE | Torque Transmitting Mechanisms | | | | | |
|---|---|---|---|---|---|---|
| | 124 | 126 | 128 | 130 | 132 | 134 |
| R |  | X | X | X |  |  |
| N |  |  |  |  |  |  |
| 1 | X |  | X | X |  |  |
| 2 | X |  | X |  | X |  |
| 3 | X |  |  | X | X |  |
| 4 | X | X |  |  | X |  |
| 5 |  | X |  | X | X |  |
| 6 |  | X |  |  | X | X |
| 7 |  | X |  | X |  | X |
| 8 | X | X |  |  |  | X |

| GEAR STATE | Torque Transmitting Mechanisms | | | | | |
|---|---|---|---|---|---|---|
| | 224 | 226 | 228 | 230 | 232 | 234 |
| R | X | X | | | | X |
| N | | | | | | |
| 1ST | X | | X | | | X |
| 2ND | X | | X | | X | |
| 3RD | X | | | | X | X |
| 4TH | X | | | X | X | |
| 5TH | | | | X | X | X |
| 6TH | | | X | X | X | |
| 7TH | | | X | X | | X |
| 8TH | | X | X | X | | |

| GEAR STATE | Torque Transmitting Mechanisms | | | | | |
| --- | --- | --- | --- | --- | --- | --- |
| | 324 | 326 | 328 | 330 | 332 | 334 |
| R |  | X | X |  |  | X |
| N |  |  |  |  |  |  |
| 1 |  | X | X | X |  |  |
| 2 | X | X |  | X |  |  |
| 3 |  | X |  | X |  | X |
| 4 | X |  |  | X |  | X |
| 5 |  |  |  | X | X | X |
| 6 | X |  |  |  | X | X |
| 7 |  | X |  |  | X | X |
| 8 | X | X |  |  | X |  |

| GEAR STATE | Torque Transmitting Mechanisms | | | | | |
|---|---|---|---|---|---|---|
| | 424 | 426 | 428 | 430 | 432 | 434 |
| R | X | X | | | | X |
| N | | | | | | |
| 1 | X | | X | | | X |
| 2 | X | | X | | X | |
| 3 | X | | | | X | X |
| 4 | X | | | X | X | |
| 5 | | | | X | X | X |
| 6 | | | X | X | X | |
| 7 | | | X | X | | X |
| 8 | | X | X | X | | |

MULTI-SPEED TRANSMISSION

CROSS-REFERENCE TO RELATED APPLICATIONS

This patent application is a divisional of U.S. application Ser. No. 12/880,928 filed on Sep. 13, 2010. The disclosure of the above application is incorporated herein by reference.

FIELD

The invention relates generally to a multiple speed transmission having a plurality of planetary gear sets and a plurality of torque transmitting mechanisms, and more particularly to a transmission having eight speeds, four planetary gear sets and a plurality of torque transmitting mechanisms.

BACKGROUND

The statements in this section merely provide background information related to the present disclosure and may or may not constitute prior art.

A typical multiple speed transmission uses a combination of friction clutches or brakes, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, four planetary gear sets and a stationary member. Each of the planetary gear sets includes first, second and third members. A first interconnecting member continuously interconnects the second member of the first planetary gear set with the third member of the second planetary gear set. A second interconnecting member continuously interconnects the third member of the first planetary gear set with the second member of the second planetary gear set. A third interconnecting member continuously interconnects the second member of the second planetary gear set with the first member of the fourth planetary gear set. A fourth interconnecting member continuously interconnects the second member of the third planetary gear set with the third member of the fourth planetary gear set. A fifth interconnecting member continuously interconnects the third member of the third planetary gear set with the second member of the fourth planetary gear set. The transmission further provides six torque transmitting mechanisms selectively engageable to interconnect one of the first members, second members, and third members with at least one of another of the first members, second members, third members, and a stationary member. The torque transmitting mechanisms are selectively engageable in combinations of at least three to establish at least eight forward speed ratios and at least one reverse speed ratio between the input member and the output member.

In another example of the present invention, a first torque transmitting mechanism is selectively engageable to interconnect the second member of the first planetary gear set and the third member of the second planetary gear set with the stationary member. A second torque transmitting mechanism is selectively engageable to interconnect the first member of the first planetary gear set with the stationary member. A third torque transmitting mechanism is selectively engageable to interconnect the first member of the third planetary gear set with the stationary member. A fourth torque transmitting mechanism is selectively engageable to interconnect the first member of the second planetary gear set with the input member. A fifth torque transmitting mechanism is selectively engageable to interconnect the first member of the first planetary gear set with the input member. A sixth torque transmitting mechanism is selectively engageable to interconnect at least one of the third member of the third planetary gear set and the second member of the fourth planetary gear set with the input member.

In yet another example of the present invention, the first members are sun gears, the second members are carrier members, the third members are ring gears. The output member is continuously interconnected to at least one of the carrier member of the third planetary gear set and the ring gear of the fourth planetary gear set. The third of the six torque transmitting mechanism and the fourth of the six torque transmitting mechanism are low loss synchronous-type torque transmitting mechanisms.

In yet another example of the present invention, the sixth of the six torque transmitting mechanisms is a low loss synchronous-type torque transmitting mechanism.

In yet another example of the present invention, a first torque transmitting mechanism is selectively engageable to interconnect the second member of the first planetary gear set and the third member of the second planetary gear set with the stationary member. A second torque transmitting mechanism is selectively engageable to interconnect the first member of the second planetary gear set with the stationary member. A third torque transmitting mechanism is selectively engageable to interconnect the first member of the third planetary gear set with the stationary member. A fourth torque transmitting mechanism is selectively engageable to interconnect the first member of the first planetary gear set with the input member. A fifth torque transmitting mechanism is selectively engageable to interconnect at least one of the third member of the third planetary gear set and the second member of the fourth planetary gear set with the input member. A sixth torque transmitting mechanism is selectively engageable to interconnect the first member of the third planetary gear set with the input member.

In yet another example of the present invention, the first member of the first planetary gear set is a sun gear, the second member of the first planetary gear set is a carrier member, the third member of the first planetary gear set is a ring gear, the first member of the second planetary gear set is a sun gear, the second member of the second planetary gear set is a carrier member, the third member of the second planetary gear set is a ring gear, the first member of the third planetary gear set is a ring gear, the second member of the third planetary gear set is a carrier member, the third member of the third planetary gear set is a sun gear, the first member of the fourth planetary gear set is a sun gear, the second member of the fourth planetary gear set is a ring gear, the third member of the fourth planetary gear set is a carrier member. The output member is continuously interconnected to the carrier member of the third planetary gear set and the carrier member of the fourth planetary gear set.

In yet another example of the present invention, a first torque transmitting mechanisms is selectively engageable to interconnect the first member of the first planetary gear set with a stationary member. A second torque transmitting mechanisms is selectively engageable to interconnect at least one of the second member of the third planetary gear set and the third member of the fourth planetary gear set with the stationary member. A third torque transmitting mechanisms is selectively engageable to interconnect at least one of the third member of the third planetary gear set and the second member of the fourth planetary gear set with the stationary member. A fourth torque transmitting mechanisms is selectively engageable to interconnect at least one of the second member of the first planetary gear set and the third member of the second planetary gear set with the input member. A fifth torque transmitting mechanisms is selectively engageable to interconnect the first member of the third planetary gear set with the input member. A sixth torque transmitting mechanisms is selectively engageable to interconnect at least one of the second member of the third planetary gear set and the third member of the fourth planetary gear set with the input member.

In yet another example of the present invention, the first member of the first planetary gear set is a sun gear, the second member of the first planetary gear set is a carrier member, the third member of the first planetary gear set is a ring gear, the first member of the second planetary gear set is a ring gear, the second member of the second planetary gear set is a sun gear, the third member of the second planetary gear set is a carrier member, the first member of the third planetary gear set is a ring gear, the second member of the third planetary gear set is a carrier member, the third member of the third planetary gear set is a sun gear, the first member of the fourth planetary gear set is a carrier member, the second member of the fourth planetary gear set is a sun gear, the third member of the fourth planetary gear set is a ring gear. The output member is continuously interconnected to the ring gear of the second planetary gear set.

In yet another example of the present invention. A first torque transmitting mechanism is selectively engageable to interconnect the first member of the first planetary gear set with a stationary member. A second torque transmitting mechanism is selectively engageable to interconnect the first member of the second planetary gear set with the stationary member. A third torque transmitting mechanism is selectively engageable to interconnect at least one of the third member of the third planetary gear set and the second member of the fourth planetary gear set with the input member. A fourth torque transmitting mechanism is selectively engageable to interconnect at least one of the second member of the third planetary gear set and the third member of the fourth planetary gear set with the input member. A fifth torque transmitting mechanism is selectively engageable to interconnect at least one of the second member of the third planetary gear set and the third member of the fourth planetary gear set with the stationary member. A sixth torque transmitting mechanism is selectively engageable to interconnect the at least one of the second member of the first planetary gear set and the third member of the second planetary gear set with the input member.

In yet another example of the present invention, the first member of the first planetary gear set is a sun gear, the second member of the first planetary gear set is a ring gear, the third member of the first planetary gear set is a carrier member, the first member of the second planetary gear set is a ring gear, the second member of the second planetary gear set is a carrier member, the third member of the second planetary gear set is a sun gear, the first member of the third planetary gear set is a carrier member, the second member of the third planetary gear set is a ring gear, the third member of the third planetary gear set is a sun gear, the first member of the fourth planetary gear set is a ring gear, the second member of the fourth planetary gear set is a sun gear, the third member of the fourth planetary gear set is a carrier member and the output member is continuously interconnected to the carrier member of the third planetary gear set.

In yet another example of the present invention, a first torque transmitting mechanism is selectively engageable to interconnect the first member of the first planetary gear set with a stationary member. A second torque transmitting mechanism is selectively engageable to interconnect at least one of the second member of the third planetary gear set and the third member of the fourth planetary gear set with the stationary member. A third torque transmitting mechanism is selectively engageable to interconnect the first member of the third planetary gear set with the stationary member. A fourth torque transmitting mechanism is selectively engageable to interconnect at least one of the second member of the first planetary gear set and the third member of the second planetary gear set with the input member. A fifth torque transmitting mechanism is selectively engageable to interconnect at least one of the third member of the third planetary gear set and the second member of the fourth planetary gear set with the input member. A sixth torque transmitting mechanism is selectively engageable to interconnect the at least one of the second member of the third planetary gear set and the third member of the fourth planetary gear set with the input member.

In yet another example of the present invention, the first member of the first planetary gear set is a sun gear, the second member of the first planetary gear set is a carrier member, the third member of the first planetary gear set is a ring gear, the first member of the second planetary gear set is a ring gear, the second member of the second planetary gear set is a sun gear, the third member of the second planetary gear set is a carrier member, the first member of the third planetary gear set is a sun gear, the second member of the third planetary gear set is a carrier member, the third member of the third planetary gear set is a ring gear, the first member of the fourth planetary gear set is a ring gear, the second member of the fourth planetary gear set is a sun gear, the third member of the fourth planetary gear set is a carrier member. The output member is continuously interconnected to the ring gear of the second planetary gear set.

Further features and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

Figure 1:
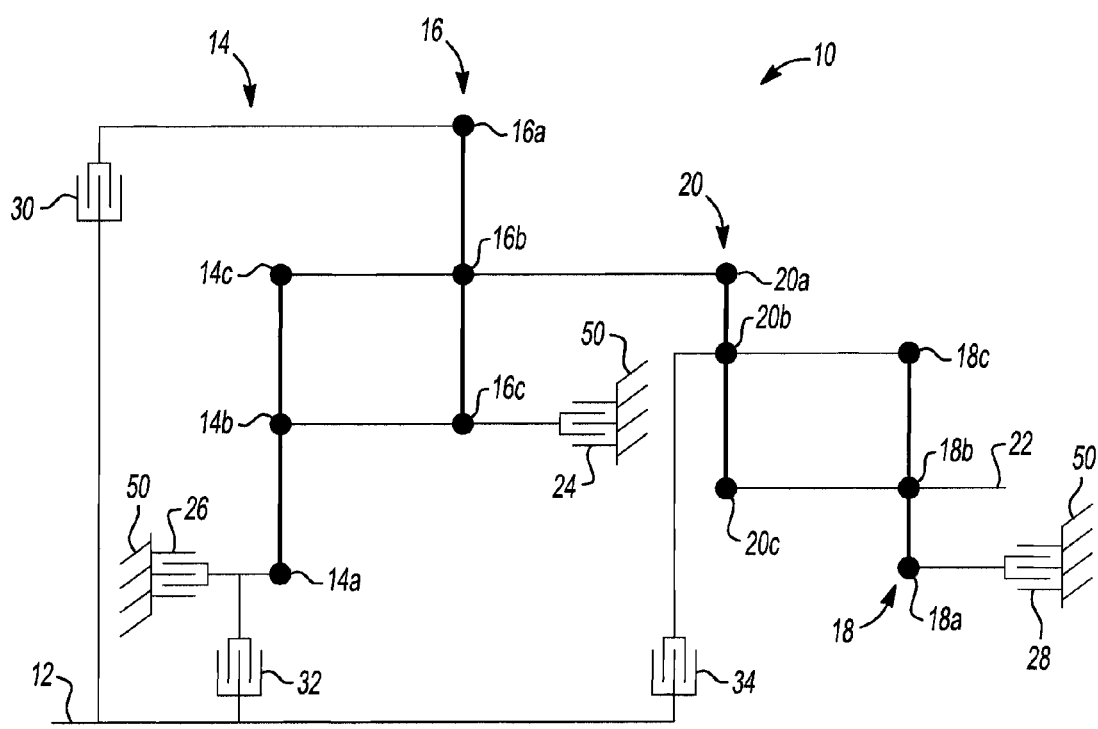
FIG. 1 is a lever diagram of an embodiment of an eight speed transmission according to the present invention.

The following description is merely exemplary in nature and is not intended to limit the present disclosure, application, or uses.

At the outset, it should be appreciated that in the particular examples provided, the automatic transmissions of the present invention have an arrangement of permanent mechanical connections between the elements of the four planetary gear sets. For example, a first component or element of a first planetary gear set is permanently coupled to a first component or element of a second planetary gear set. A second component or element of the first planetary gear set is permanently coupled to a second component or element of the second planetary gear set. A first component or element of a third planetary gear set is permanently coupled to a first component or element of a fourth planetary gear set. The second component or element of the second planetary gear set is permanently coupled to the third component or element of the fourth planetary gear set. Finally, a second component or element of the third planetary gear set is permanently coupled to a second component or element of the fourth planetary gear set.

Referring now to FIGS. 1, 4, 7, 10, 13, several examples of an eight speed transmission are illustrated in a lever diagram format in accordance with the present invention. A lever diagram is a schematic representation of the components of a mechanical device such as an automatic transmission. Each individual lever represents a planetary gear set wherein the three basic mechanical components of the planetary gear set are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve appropriate ratios and ratio progression. Mechanical couplings or interconnections between the nodes of the various planetary gear sets are illustrated by thin, horizontal lines and torque transmitting mechanisms such as clutches and brakes are presented as interleaved fingers. If the device is a brake, one set of the fingers is grounded. Further explanation of the format, purpose and use of lever diagrams can be found in SAE Paper 810102, "The Lever Analogy: A New Tool in Transmission Analysis" by Benford and Leising which is hereby fully incorporated by reference.

With continuing reference to FIGS. 1, 4, 7, 10, 13, transmissions 10, 110, 210, 310, 410 include an input shaft or member 12, 112, 212, 312, 412 a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, a fourth planetary gear set 20 having three nodes: a first node 20A, a second node 20B and a third node 20C and an output shaft or member 22, 122, 222, 322, 422.

In the examples of the present invention shown in FIGS. 1, 4, 7, 10, 13, the second node 14B of the first planetary gear set 14 is coupled to the third node 16C of the second planetary gear set 16. The third node 14C of the first planetary gear set 14 is coupled to the second node 16B of the second planetary gear set 16. The second node 16B of the second planetary gear set 16 and the third node 14C of the first planetary gear set 14 are coupled to the first node 20A of the fourth planetary gear set 20. The third node 18C of the third planetary gear set 18 is coupled to the second node 20B of the fourth planetary gear set 20. The second node 18B of the third planetary gear set 18 is coupled to the third node 20C of the fourth planetary gear set 20.

Referring now to FIG. 1, an example of the transmission 10 includes a first brake 24 selectively connecting the third node 16C of the second planetary gear set 16 with a stationary member 50. A second brake 26 selectively connects the first node 14A of the first planetary gear set 14 with the stationary member 50. A third brake 28 selectively connects the first node 18A of the third planetary gear set 18 with a stationary member 50. A first clutch 30 selectively connects the first node 16A of the second planetary gear set 16 with the input shaft or member 12. A second clutch 32 selectively connects the first node 14A of the first planetary gear set 14 with the input shaft or member 12. A third clutch 34 selectively connects the second node 20B of the fourth planetary gear set 20 with the input shaft or member 12. The output shaft or member 22 is coupled to the second node 18B of the third planetary gear set 18.

Figure 2A:
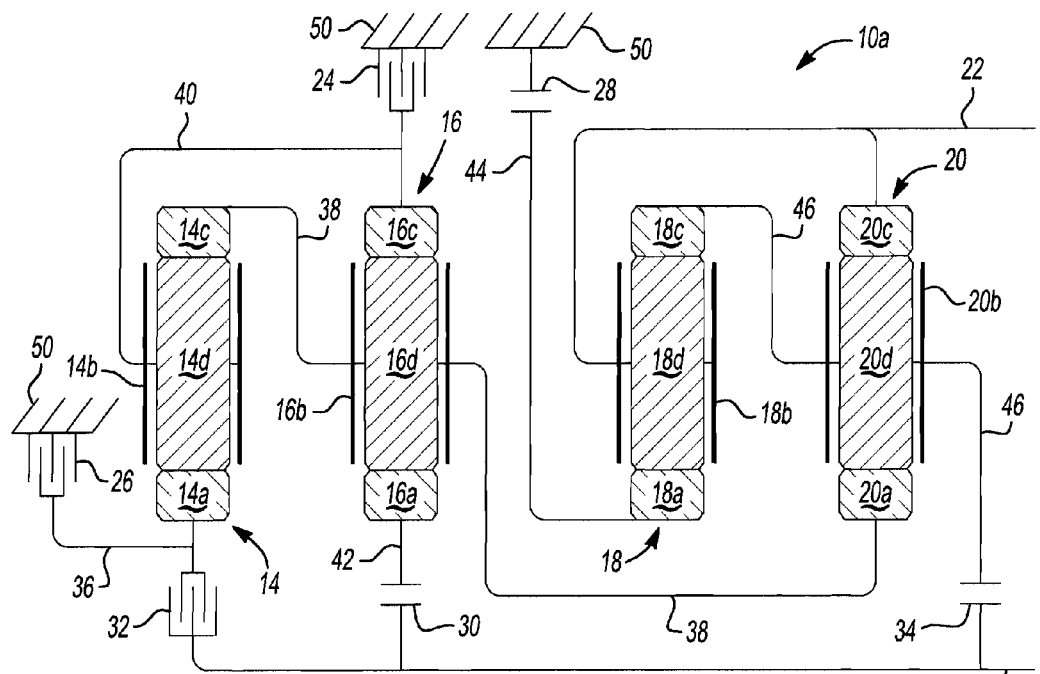
FIG. 2A is a diagrammatic view of an embodiment of an eight speed transmission according to the present invention.
Figure 2B:
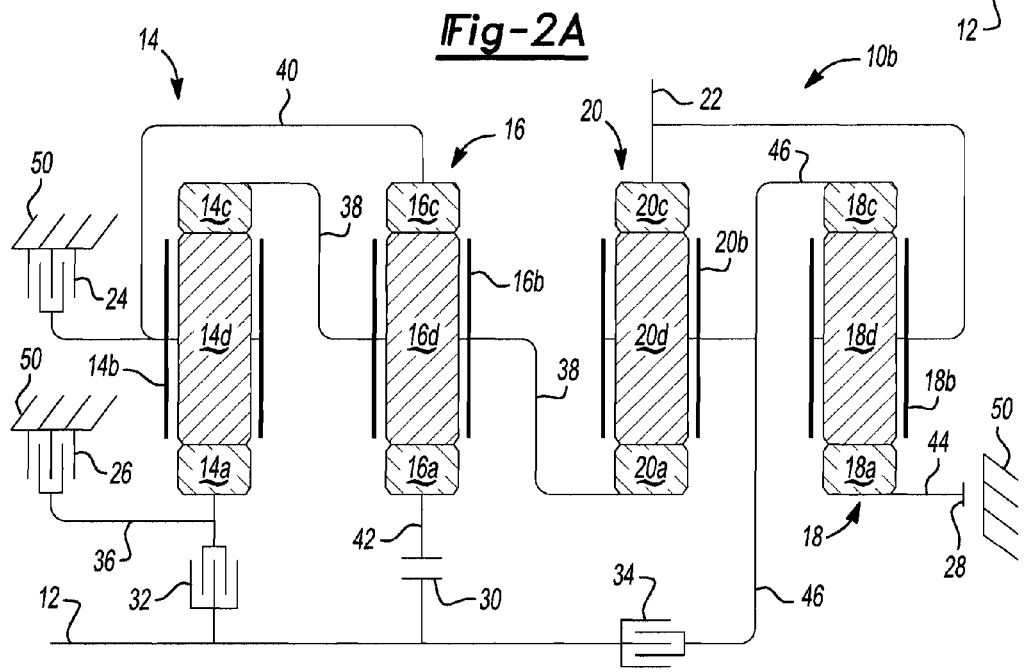
FIG. 2B is a diagrammatic view of an embodiment of an eight speed transmission according to the present invention.
Figure 2C:
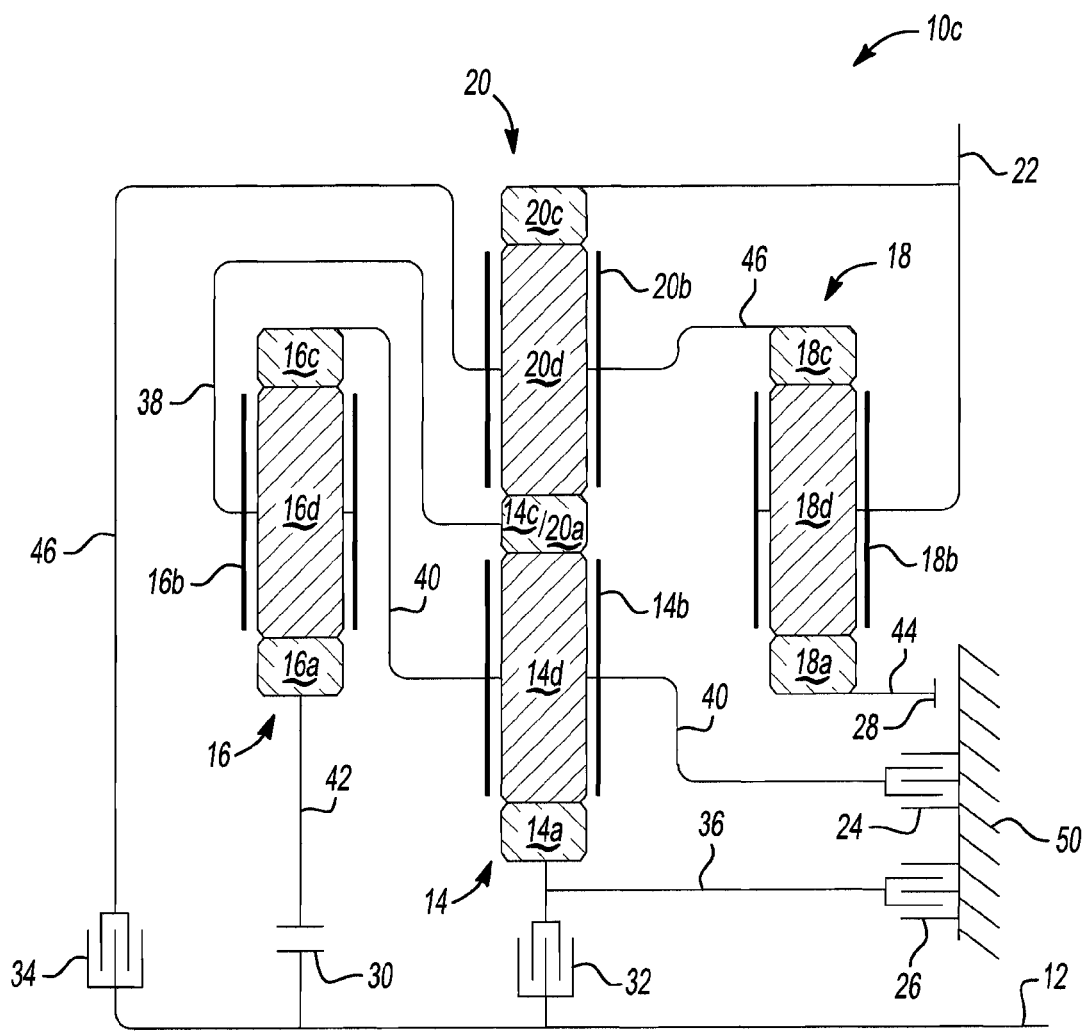
FIG. 2C is a diagrammatic view of an embodiment of an eight speed transmission according to the present invention.

Referring now to FIGS. 2A, 2B, 2C, three stick diagrams each present a schematic layout of an example of the eight speed transmission 10A, 10B, 10C according to the present invention. In FIGS. 2A, 2B, 2C, the numbering from the lever diagram of FIG. 1 is carried over. The clutches, brakes, and couplings are correspondingly presented whereas the nodes of the planetary gear sets now appear as components of planetary gear sets such as sun gears, ring gears, planet gears and planet gear carriers.

For example, the planetary gear set 14 of transmissions 10A, 10B includes a sun gear member 14A, a ring gear member 14C, and a planet gear carrier member 14B that rotatably supports a set of planet gears 14D (only one of which is shown). The sun gear member 14A is connected for common rotation with a first shaft or interconnecting member 36. The ring gear member 14C is connected for common rotation with a second shaft or interconnecting member 38. The carrier member 14B is connected for common rotation with a third shaft or interconnecting member 40. The planet gears 14D are each configured to intermesh with both of the sun gear member 14A and the ring gear member 14C.

The planetary gear set 14 of transmission 10C includes a sun gear member 14A, a combination gear member 14C/20A, and a planet gear carrier member 14B that rotatably supports a set of planet gears 14D (only one of which is shown). The combination gear member 14C/20A is employed as a ring gear member for the first planetary gear set 14 and a sun gear member for the fourth planetary gear set 20. The combination gear member 14C/20A combines the function of a sun gear member, a ring gear member and a shaft or interconnecting member. The sun gear member 14A is connected for common rotation with a first shaft or interconnecting member 36. The combination gear member 14C/20A is connected for common rotation with a second shaft or interconnecting member 38. The carrier member 14B is connected for common rotation with a third shaft or interconnecting member 40. The planet gears 14D are each configured to intermesh with both of the sun gear member 14A and the combination gear member 14C/20A.

The planetary gear set 16 of transmissions 10A, 10B, 10C include a sun gear member 16A, a ring gear member 16C, and a planet gear carrier member 16B that rotatably supports a set of planet gears 16D (only one of which is shown). The sun gear member 16A is connected for common rotation a fourth shaft or interconnecting member 42. The ring gear member 16C is connected for common rotation with the third shaft or interconnecting member 40. The planet carrier member 16B is connected for common rotation with the second shaft or interconnecting member 38. The planet gears 16D are each configured to intermesh with both of the sun gear member 16A and the ring gear member 16C.

The planetary gear set 18 of transmissions 10A, 10B, 10C include a sun gear member 18A, a ring gear member 18C, and a planet gear carrier member 18B that rotatably supports a set of planet gears 18D (only one of which is shown). The sun gear member 18A is connected for common rotation with a fifth shaft or interconnecting member 44. The ring gear member 18C is connected for common rotation with a sixth shaft or interconnecting member 46. The planet carrier member 18B is connected for common rotation with the output shaft or member 22. The planet gears 18D are each configured to intermesh with both of the sun gear member 18A and the ring gear member 18C.

The planetary gear set 20 of transmissions 10A, 10B include a sun gear member 20A, a ring gear member 20C, and a planet gear carrier member 20B that rotatably supports a set of planet gears 20D (only one of which is shown). The sun gear member 20A is connected for common rotation with the second shaft or interconnecting member 38. The ring gear member 20C is connected for common rotation with the output shaft or member 22. The planet carrier member 20B is connected for common rotation with the sixth shaft or interconnecting member 46. The planet gears 20D are each configured to intermesh with both of the sun gear member 20A and the ring gear member 20C.

The planetary gear set 20 of transmission 10C includes the combination gear member 14C/20A, a ring gear member 20C, and a planet gear carrier member 20B that rotatably supports a set of planet gears 20D (only one of which is shown). As stated above, the combination gear member 14C/20A is connected for common rotation with the second shaft or interconnecting member 38. The ring gear member 20C is connected for common rotation with the output shaft or member 22. The planet carrier member 20B is connected for common rotation with the sixth shaft or interconnecting member 46. The planet gears 20D are each configured to intermesh with both of the combination gear member 14C/20A and the ring gear member 20C.

The input shaft or member 12 is preferably continuously connected to an engine (not shown) or to a turbine of a torque converter (not shown). The output shaft or member 22 is preferably continuously connected with the final drive unit or transfer case (not shown).

The torque transmitting mechanisms or brakes 24, 26, 28 and clutches 30, 32, 34 allow for selective interconnection of the shafts or interconnecting members, members of the planetary gear sets and the housing. For example, a first brake 24 is selectively engageable to interconnect the third shaft or interconnecting member 40 with the stationary member or transmission housing 50. A second brake 26 is selectively engageable to interconnect the first shaft or interconnecting member 36 with the stationary member or transmission housing 50. A third brake 28 is selectively engageable to interconnect the fifth shaft or interconnecting member 44 with the stationary member or transmission housing 50. A first clutch 30 is selectively engageable to interconnect the fourth shaft or interconnecting member 42 with the input shaft or member 12. A second clutch 32 is selectively engageable to interconnect the first shaft or interconnecting member 36 with the input shaft or member 12. The third clutch 34 is selectively engageable to interconnect the sixth shaft or interconnecting member 46 with the input shaft or member 12.

Although the present invention contemplates the use of piston and interleaved disc-type torque transmitting mechanisms, other types of torque transmitting mechanisms may be included in the transmission without departing from the scope of the invention. For example, the present invention may include several low loss synchronous-type torque transmitting mechanisms for use as either clutches or brakes in lieu of a piston and interleaved disc-type torque transmitting mechanism. The low loss synchronous-type torque transmitting mechanism is capable of selectively engaging one of a sun gear member, ring gear member and carrier member with another sun gear member, ring gear member, carrier member, an input or output shaft or member and a stationary member. The advantages of low loss synchronous-type torque transmitting mechanisms include improved spin losses and gear mesh losses. The low loss synchronous-type torque transmitting mechanisms are commonly referred to in the industry as a "dog" clutch or brake. In the FIGS. 2A, 2B, 2C the low loss synchronous-type torque transmitting mechanisms are represented by a pair of parallel lines that are perpendicular to the line representing the shaft or interconnecting members that the torque transmitting mechanism selectively connects. For example, transmissions 10A, 10B, 10C provide that the third brake 28 and the first clutch 30 are low loss synchronous-type torque transmitting mechanisms. Also, transmission 10A further provides a low loss synchronous-type torque transmitting mechanism as the third clutch 34.

Figures 3, 4:
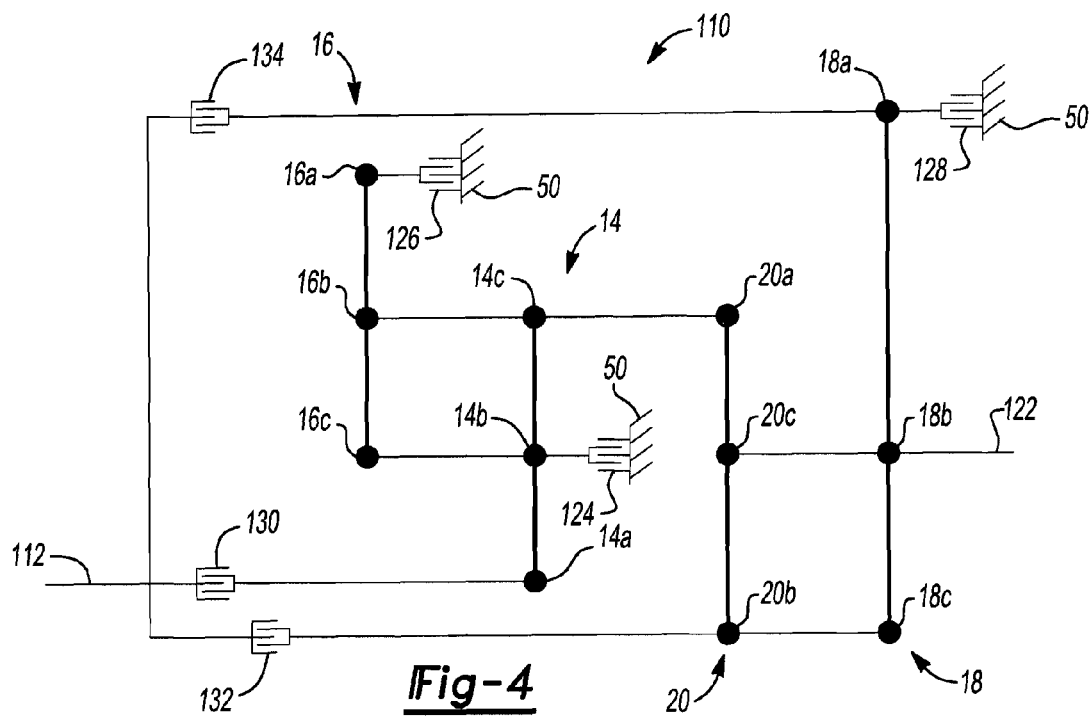
FIG. 3 is a truth table presenting the state of engagement of the various torque transmitting mechanisms in each of the available forward and reverse speeds or gear ratios of the transmission illustrated in FIGS. 1 and 2A, 2B, 2C.
FIG. 4 is a lever diagram of an embodiment of an eight speed transmission according to the present invention.

Referring now to FIGS. 2A, 2B, 2C and 3, the operation of the embodiment of the ten speed transmission 10 will be described. It will be appreciated that the transmissions 10A, 10B, 10C are capable of transmitting torque from the input shaft or member 12 to the output shaft or member 22 in at least eight forward speed or torque ratios and at least one reverse speed or torque ratio with a triple overdrive. Each forward and reverse speed or torque ratio is attained by engagement of one or more of the torque transmitting mechanisms (i.e. first brake 24, second brake 26, third brake 28, first clutch 30, second clutch 32, and third clutch 34), as will be explained below. FIG. 3 is a truth table presenting the various combinations of torque transmitting mechanisms that are activated or engaged to achieve the various gear states. Gear ratios are achievable depending on the gear diameter, gear teeth count and gear configuration selected.

To establish reverse gear, the first brake 24, the third brake 28 and the second clutch 32 are engaged or activated. The first brake 24 connects the third shaft or interconnecting member 40 with the stationary member or transmission housing 50 in order to prevent the third shaft or interconnecting member 40 and therefore the carrier member 14B of the first planetary gear set 14 and the ring gear member 16C of the second planetary gear set 16 from rotating relative to the transmission housing 50. The third brake 28 connects the fifth shaft or interconnecting member 44 with the stationary member or transmission housing 50 in order to prevent the fifth shaft or interconnecting member 44 and therefore the sun gear member 18A of the third planetary gear set 18 from rotating relative to the transmission housing 50. The second clutch 32 connects the first shaft or interconnecting member 36 with the input shaft or member 12. Likewise, the eight forward ratios are achieved through different combinations of clutch and brake engagement, as shown in FIG. 3.

It will be appreciated that the foregoing explanation of operation and gear states of the eight speed transmission 10 assumes, first of all, that all the clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

Referring now to FIG. 4, another example of the transmission 110 includes a first brake 124 selectively connecting the third node 16C of the second planetary gear set 16 and the second node 14B of the first planetary gear set 14 with a stationary member 50. A second brake 126 selectively connects the first node 16A of the second planetary gear set 16 with the stationary member 50. A third brake 128 selectively connects the first node 18A of the third planetary gear set 18 with a stationary member 50. A first clutch 130 selectively connects the first node 14A of the first planetary gear set 14 with the input shaft or member 112. A second clutch 132 selectively connects the second node 20B of the fourth planetary gear set 20 with the input shaft or member 112. A third clutch 134 selectively connects the first node 18A of the third planetary gear set 18 with the input shaft or member 112. The output shaft or member 122 is coupled to the second node 18B of the third planetary gear set 18.

Figure 5:
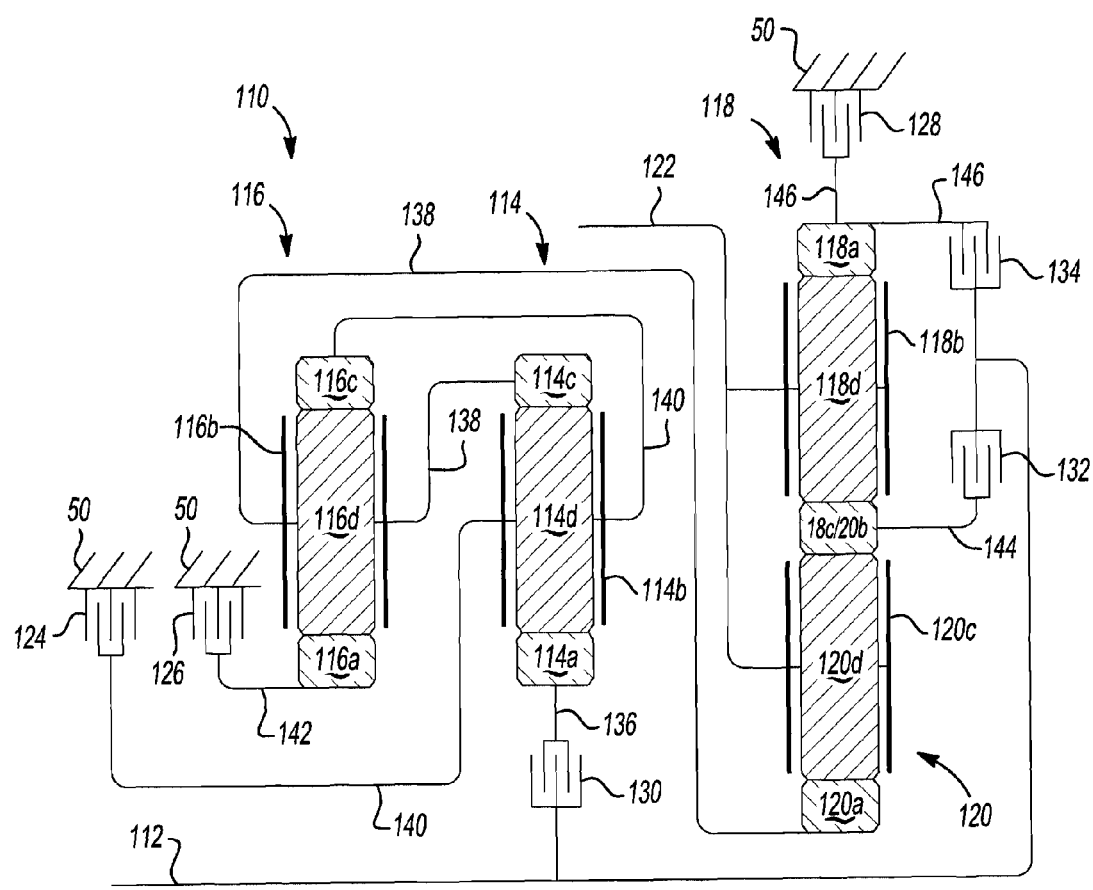
FIG. 5 is a diagrammatic view of an embodiment of a nine speed transmission according to the present invention.

Referring now to FIG. 5, a stick diagram presents a schematic layout of another example of the eight speed transmission 110 according to the present invention. The clutches, brakes, and couplings are correspondingly presented whereas the nodes of the planetary gear sets now appear as components of planetary gear sets such as sun gears, ring gears, planet gears and planet gear carriers.

For example, the planetary gear set 114 includes a sun gear member 114A, a ring gear member 114C, and a planet gear carrier member 114B that rotatably supports a set of planet gears 114D (only one of which is shown). The sun gear member 114A is connected for common rotation with a first shaft or interconnecting member 136. The ring gear member 114C is connected for common rotation with a second shaft or interconnecting member 138. The carrier member 114B is connected for common rotation with a third shaft or interconnecting member 140. The planet gears 114D are each configured to intermesh with both of the sun gear member 114A and the ring gear member 114C.

The planetary gear set 116 includes a sun gear member 116A, a ring gear member 116C, and a planet gear carrier member 116B that rotatably supports a set of planet gears 116D (only one of which is shown). The sun gear member 116A is connected for common rotation a fourth shaft or interconnecting member 142. The ring gear member 116C is connected for common rotation with the third shaft or interconnecting member 140. The planet carrier member 116B is connected for common rotation with the second shaft or interconnecting member 138. The planet gears 116D are each configured to intermesh with each of the sun gear member 116A and the ring gear member 116C.

The planetary gear set 118 includes a combination gear member 18C/20B, a ring gear member 118A, and a planet gear carrier member 118B that rotatably supports a set of planet gears 118D (only one of which is shown). The combination gear member 18C/20B is employed as a sun gear member for the third planetary gear set 118 and a ring gear member for the fourth planetary gear set 120. The combination gear member 18C/20B combines the function of a sun gear member, a ring gear member and a shaft or interconnecting member. The combination gear member 18C/20B is connected for common rotation with a fifth shaft or interconnecting member 144. The ring gear member 118A is connected for common rotation with a sixth shaft or interconnecting member 146. The planet carrier member 118B is connected for common rotation with the output shaft or member 122. The planet gears 118D are each configured to intermesh with both of the combination gear member 18C/20B and the ring gear member 118A.

The planetary gear set 120 includes a sun gear member 120A, the combination gear member 18C/20B, and a planet gear carrier member 120C that rotatably supports a set of planet gears 120D (only one of which is shown). The sun gear member 120A is connected for common rotation with the second shaft or interconnecting member 138. As stated above, the combination gear member 18C/20B is connected for common rotation with the fifth shaft or interconnecting member 144. The planet carrier member 120C is connected for common rotation with the output shaft or member 122. The planet gears 120D are each configured to intermesh with both of the sun gear member 120A and the combination gear member 18C/20B.

The input shaft or member 112 is preferably continuously connected to an engine (not shown) or to a turbine of a torque converter (not shown). The output shaft or member 122 is preferably continuously connected with the final drive unit or transfer case (not shown).

The torque transmitting mechanisms or the brakes 124, 126, 128 and the clutches 130, 132, 134 allow for selective interconnection of the shafts or interconnecting members, members of the planetary gear sets and the housing. For example, the first brake 124 is selectively engageable to interconnect the third shaft or interconnecting member 140 with the stationary member or transmission housing 50. The second brake 126 is selectively engageable to interconnect the fourth shaft or interconnecting member 142 with the stationary member or transmission housing 50. The third brake 128 is selectively engageable to interconnect the sixth shaft or interconnecting member 146 with the stationary member or transmission housing 50. The first clutch 130 is selectively engageable to interconnect the sun the first shaft or interconnecting member 136 with the input shaft or member 112. The second clutch 132 is selectively engageable to interconnect the fifth shaft or interconnecting member 144 with the input shaft or member 112. The third clutch 134 is selectively engageable to interconnect the sixth shaft or interconnecting member 146 with the input shaft or member 112.

Figures 6, 7:
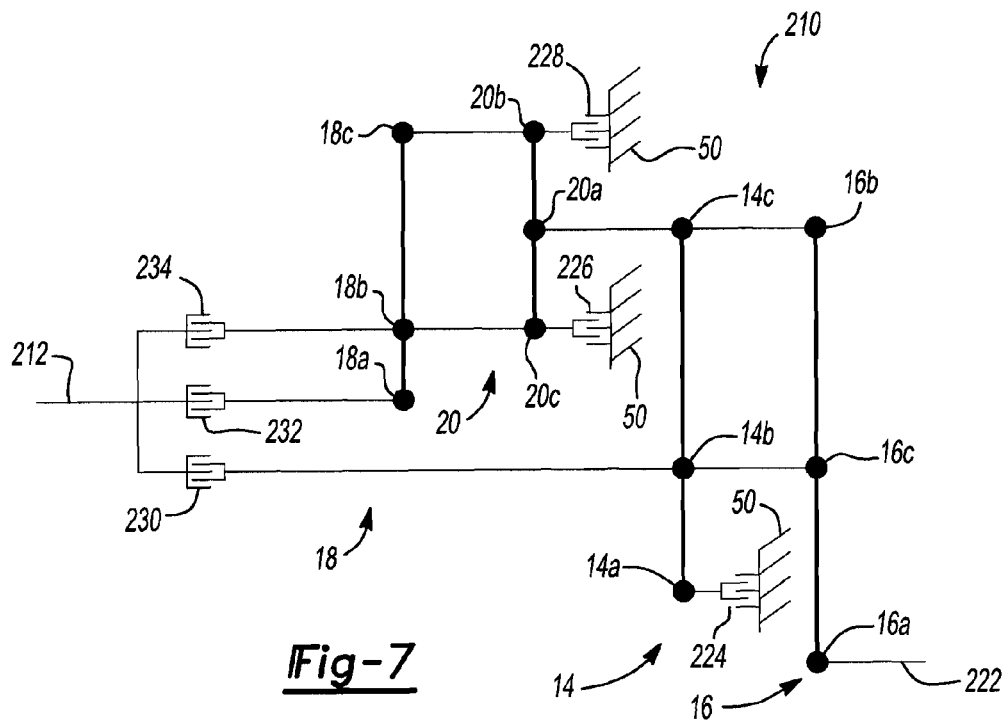
FIG. 6 is a truth table presenting the state of engagement of the various torque transmitting mechanisms in each of the available forward and reverse speeds or gear ratios of the transmission illustrated in FIGS. 4 and 5.
FIG. 7 is a lever diagram of an embodiment of an eight speed transmission according to the present invention.

Referring now to FIGS. 5 and 6, the operation of the embodiment of the ten speed transmission 110 will be described. It will be appreciated that the transmission 110 is capable of transmitting torque from the input shaft or member 112 to the output shaft or member 122 in at least eight forward speed or torque ratios and at least one reverse speed or torque ratio with a triple overdrive. Each forward and reverse speed or torque ratio is attained by engagement of one or more of the torque transmitting mechanisms (i.e. first brake 124, second brake 126, third brake 128, first clutch 130, second clutch 132, and third clutch 134), as will be explained below. FIG. 6 is a truth table presenting the various combinations of torque transmitting mechanisms that are activated or engaged to achieve the various gear states. Gear ratios are achievable depending on the gear diameter, gear teeth count and gear configuration selected.

To establish reverse gear, the second brake 126, the third brake 128 and the first clutch 130 are engaged or activated. The second brake 126 connects the fourth shaft or interconnecting member 142 with the stationary member or transmission housing 50 in order to prevent the fourth shaft or interconnecting member 142 and therefore the sun gear member 116A of the second planetary gear set 116 from rotating relative to the transmission housing 50. The third brake 128 connects the sixth shaft or interconnecting member 146 with the stationary member or transmission housing 50 in order to prevent the sixth shaft or interconnecting member 146 and therefore the ring gear member 118A of the third planetary gear set 118 from rotating relative to the transmission housing 50. The first clutch 130 connects the first shaft or interconnecting member 136 with the input shaft or member 112. Likewise, the eight forward ratios are achieved through different combinations of clutch and brake engagement, as shown in FIG. 6.

It will be appreciated that the foregoing explanation of operation and gear states of the eight speed transmission 110 assumes, first of all, that all the clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

Referring now to FIG. 7, another example of the transmission 210 includes a first brake 224 selectively connecting the first node 14A of the first planetary gear set 14 with a stationary member 50. A second brake 226 selectively connects the second node 18B of the third planetary gear set 18 and the third node 20C of the fourth planetary gear set 20 with the stationary member 50. A third brake 228 selectively connects the third node 18C of the third planetary gear set 18 and the second node 20B of the fourth planetary gear set 20 with a stationary member 50. A first clutch 230 selectively connects the second node 14B of the first planetary gear set 14 with the input shaft or member 12. A second clutch 232 selectively connects the first node 18A of the third planetary gear set 18 with the input shaft or member 12. A third clutch 234 selectively connects the third node 20C of the fourth planetary gear set 20 and the second node 18B of the third planetary gear set 18 with the input shaft or member 12. The output shaft or member 222 is coupled to the first node 16A of the second planetary gear set 16.

Figure 8:
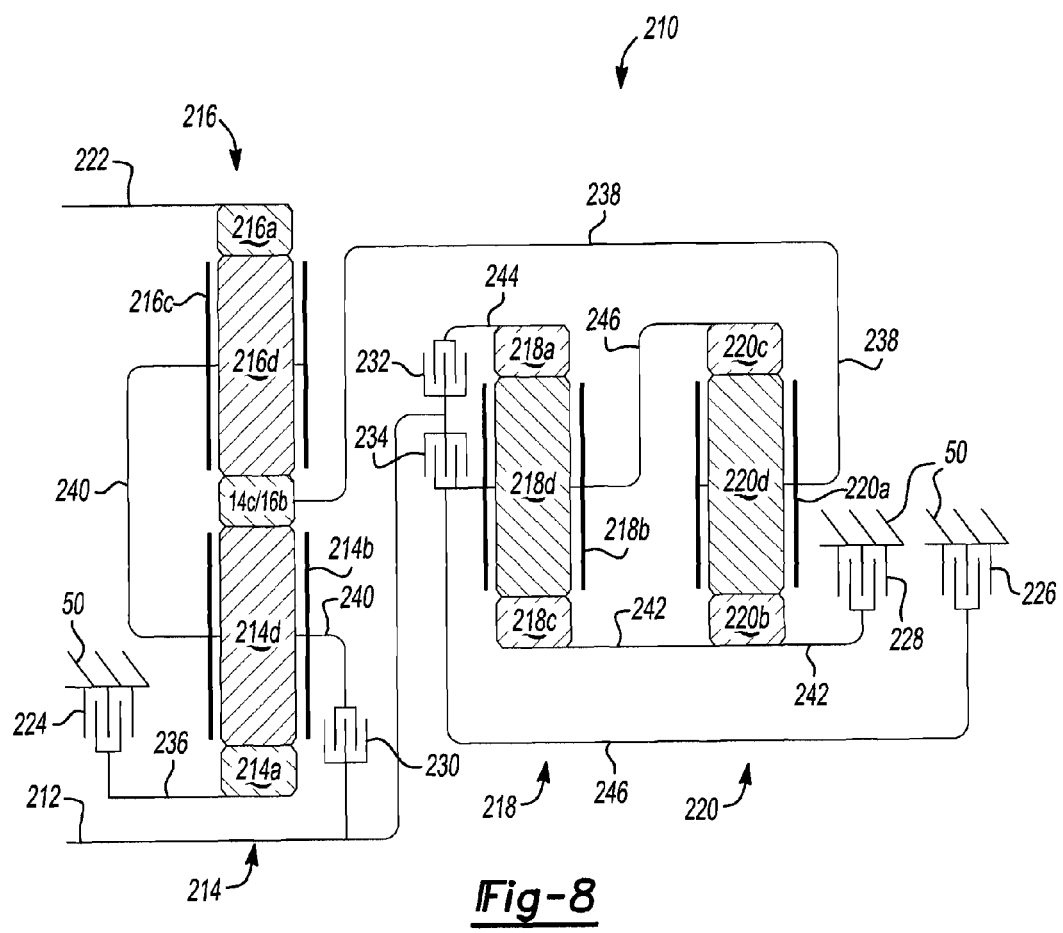
FIG. 8 is a diagrammatic view of an embodiment of a nine speed transmission according to the present invention.

Referring now to FIG. 8, a stick diagram presents a schematic layout of another example of the eight speed transmission 210 according to the present invention. The clutches, brakes, and couplings are correspondingly presented whereas the nodes of the planetary gear sets now appear as components of planetary gear sets such as sun gears, ring gears, planet gears and planet gear carriers.

For example, the planetary gear set 214 includes a sun gear member 214A, a combination gear member 14C/16B, and a planet gear carrier member 214B that rotatably supports a set of planet gears 214D (only one of which is shown). The combination gear member 14C/16B is employed as a ring gear member for the first planetary gear set 214 and a sun gear member for the second planetary gear set 16. The combination gear member 14C/16B combines the function of a ring gear member, a sun gear member and an interconnecting member. The sun gear member 214A is connected for common rotation with a first shaft or interconnecting member 236. The combination gear member 14C/16B is connected for common rotation with a second shaft or interconnecting member 238. The carrier member 214B is connected for common rotation with a third shaft or interconnecting member 240. The planet gears 214D are each configured to intermesh with each of the sun gear member 214A and the combination gear member 14C/16B.

The planetary gear set 216 includes the combination gear member 14C/16B, a ring gear member 216A, and a planet gear carrier member 216C that rotatably supports a set of planet gears 216D (only one of which is shown). As stated above, the combination gear member 14C/16B is connected for common rotation the second shaft or interconnecting member 238. The ring gear member 216A is connected for common rotation with the output shaft or member 222. The planet carrier member 216C is connected for common rotation with the third shaft or interconnecting member 240. The planet gears 216D are each configured to intermesh with both of the combination gear member 14C/16B and the ring gear member 216A.

The planetary gear set 218 includes a sun gear member 218C, a ring gear member 218A, and a planet gear carrier member 218B that rotatably supports a set of planet gears 218D (only one of which is shown). The sun gear member 218C is connected for common rotation with a fourth shaft or interconnecting member 242. The ring gear member 218A is connected for common rotation with a fifth shaft or interconnecting member 244. The planet carrier member 218B is connected for common rotation with a sixth shaft or interconnecting member 246. The planet gears 218D are each configured to intermesh with both of the sun gear member 218C and the ring gear member 218A.

The planetary gear set 220 includes a sun gear member 220B, the ring gear member 220C, and a planet gear carrier member 220A that rotatably supports a set of planet gears 220D (only one of which is shown). The sun gear member 220B is connected for common rotation with the fourth shaft or interconnecting member 242. The ring gear member 220C is connected for common rotation with the sixth shaft or interconnecting member 246. The planet carrier member 220A is connected for common rotation with the second shaft or interconnecting member 238. The planet gears 220D are each configured to intermesh with both of the sun gear member 220B and the ring gear member 220C.

The input shaft or member 212 is preferably continuously connected to an engine (not shown) or to a turbine of a torque converter (not shown). The output shaft or member 222 is preferably continuously connected with the final drive unit or transfer case (not shown).

The torque transmitting mechanisms or the brakes 224, 226, 228 and the clutches 230, 232, 234 allow for selective interconnection of the shafts or interconnecting members, members of the planetary gear sets and the housing. For example, the first brake 224 is selectively engageable to interconnect the first shaft or interconnecting member 236 with the stationary member or transmission housing 50. The second brake 226 is selectively engageable to interconnect the sixth shaft or interconnecting member 246 with the stationary member or transmission housing 50. The third brake 228 is selectively engageable to interconnect the fourth shaft or interconnecting member 242 with the stationary member or transmission housing 50. The first clutch 230 is selectively engageable to interconnect the third shaft or interconnecting member 240 with the input shaft or member 212. The second clutch 232 is selectively engageable to interconnect the fifth shaft or interconnecting member 244 with the input shaft or member 212. The third clutch 234 is selectively engageable to interconnect the sixth shaft or interconnecting member 246 with the input shaft or member 212.

Figures 9, 10:
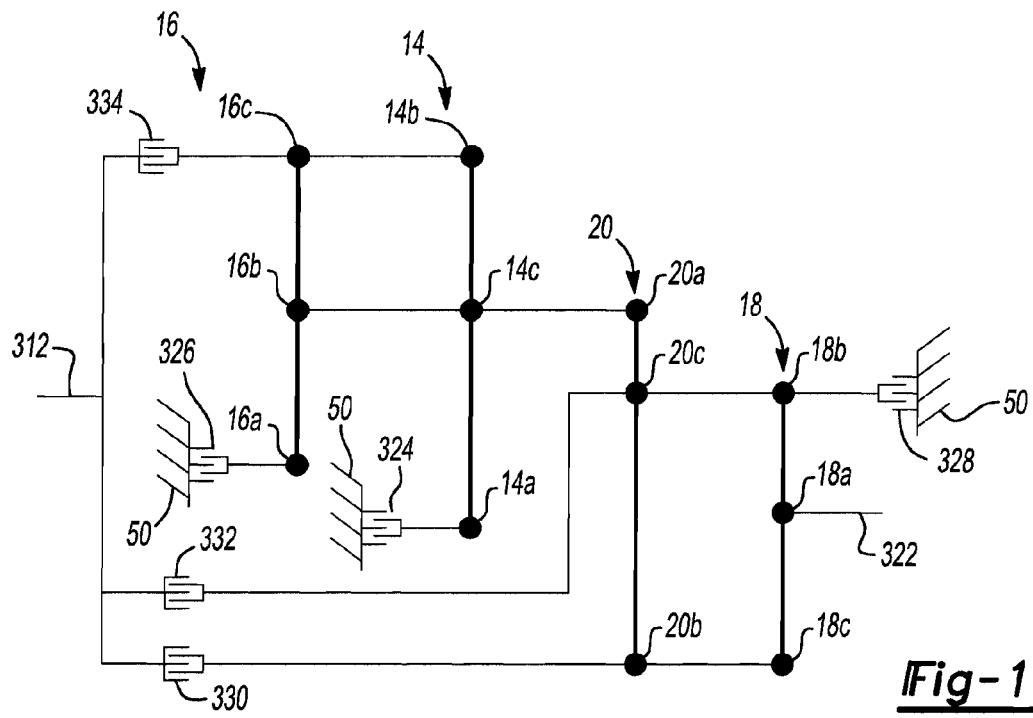
FIG. 9 is a truth table presenting the state of engagement of the various torque transmitting mechanisms in each of the available forward and reverse speeds or gear ratios of the transmission illustrated in FIGS. 7 and 8.
FIG. 10 is a lever diagram of an embodiment of an eight speed transmission according to the present invention.

Referring now to FIGS. 8 and 9, the operation of the embodiment of the ten speed transmission 210 will be described. It will be appreciated that the transmission 210 is capable of transmitting torque from the input shaft or member 212 to the output shaft or member 222 in at least eight forward speed or torque ratios and at least one reverse speed or torque ratio with a triple overdrive. Each forward and reverse speed or torque ratio is attained by engagement of one or more of the torque transmitting mechanisms (i.e. first brake 224, second brake 226, third brake 228, first clutch 230, second clutch 232, and third clutch 234), as will be explained below. FIG. 9 is a truth table presenting the various combinations of torque transmitting mechanisms that are activated or engaged to achieve the various gear states.ABear ratios are achievable depending on the gear diameter, gear teeth count and gear configuration selected.

To establish reverse gear, the first brake 224 the second brake 226, the third clutch 234 are engaged or activated. The first brake 224 connects the first shaft or interconnecting member 236 with the stationary member or transmission housing 50 in order to prevent the first shaft or interconnecting member 236 and therefore the sun gear member 214A of the first planetary gear set 214 from rotating relative to the transmission housing 50. The second brake 226 connects the sixth shaft or interconnecting member 246 with the stationary member or transmission housing 50 in order to prevent the sixth shaft or interconnecting member 246 and therefore the ring gear member 220C of the fourth planetary gear set 220 and the planet carrier member 218B of the third planetary gear set 218 from rotating relative to the transmission housing 50. The third clutch 234 connects the sixth shaft or interconnecting member 246 with the input shaft or member 212. Likewise, the eight forward ratios are achieved through different combinations of clutch and brake engagement, as shown in FIG. 9.

It will be appreciated that the foregoing explanation of operation and gear states of the eight speed transmission 210 assumes, first of all, that all the clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

Referring now to FIG. 10, an example of the transmission 310 includes a first brake 324 selectively connecting the first node 14A of the first planetary gear set 14 with a stationary member 50. A second brake 326 selectively connects the first node 16A of the second planetary gear set 16 with the stationary member 50. A third brake 328 selectively connects the third node 20C of the fourth planetary gear set 20 and the second node 18B of the third planetary gear set 18 with the stationary member 50. A first clutch 330 selectively connects the second node 20B of the fourth planetary gear set 20 with the input shaft or member 312. A second clutch 332 selectively connects the second node 18B of the third planetary gear set 18 and the third node 20C of the fourth planetary gear set 20 with the input shaft or member 312. A third clutch 334 selectively connects the third node 16C of the second planetary gear set 16 and the second node 14B of the first planetary gear set 14 with the input shaft or member 312. The output shaft or member 322 is coupled to the first node 18A of the third planetary gear set 18.

Figure 11:
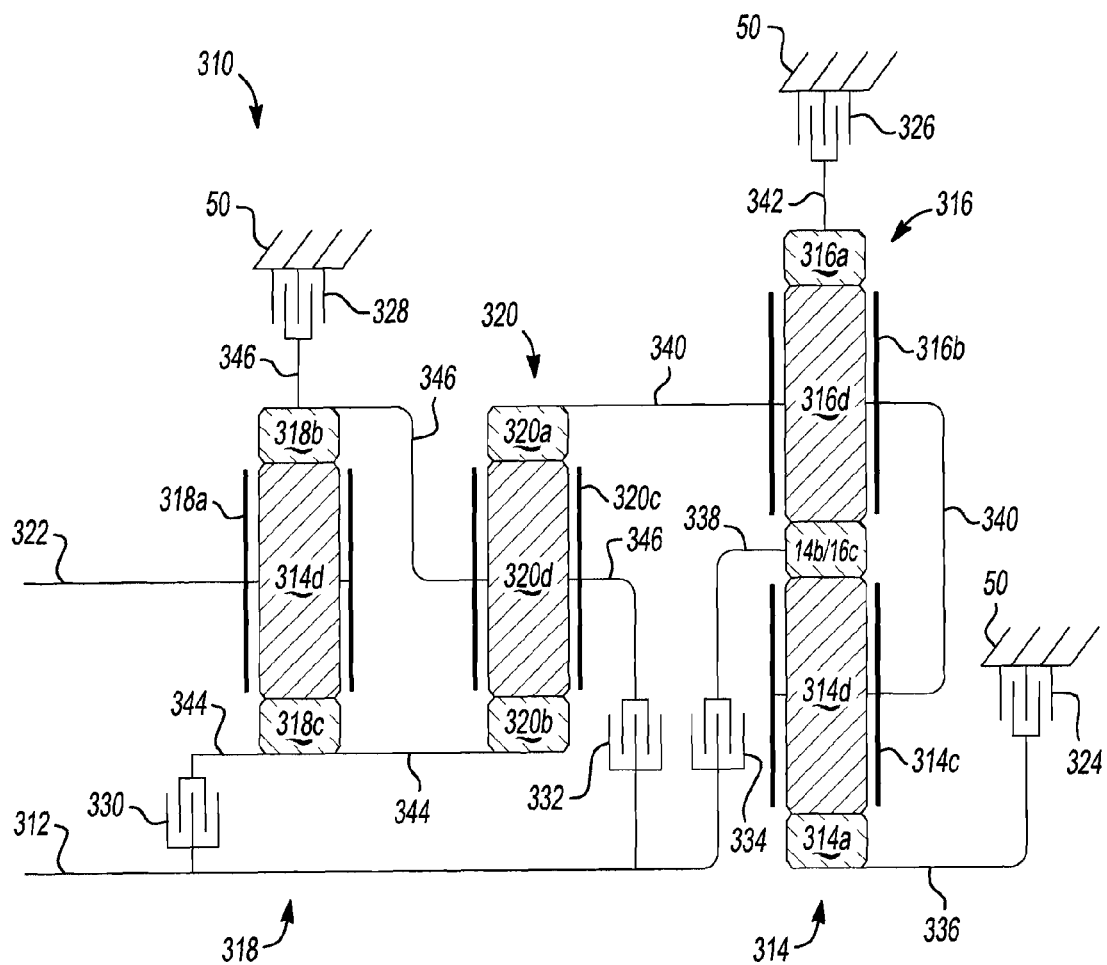
FIG. 11 is a diagrammatic view of an embodiment of a nine speed transmission according to the present invention.

Referring now to FIG. 11, a stick diagram presents a schematic layout of another example of the eight speed transmission 310 according to the present invention. The clutches, brakes, and couplings are correspondingly presented whereas the nodes of the planetary gear sets now appear as components of planetary gear sets such as sun gears, ring gears, planet gears and planet gear carriers.

For example, the planetary gear set 314 includes a sun gear member 314A, a combination gear member 14B/16C, and a planet gear carrier member 314C that rotatably supports a set of planet gears 314D (only one of which is shown). The combination gear member 14B/16C is employed as a ring gear member for the first planetary gear set 314 and a sun gear member for the second planetary gear set 316. The combination gear member 14B/16C combines the function of a ring gear member, a sun gear member and an interconnecting member. The sun gear member 314A is connected with a first shaft or interconnecting member 336. The combination gear member 14B/16C is connected for common rotation with a second shaft or interconnecting member 338. The carrier member 314C is connected for common rotation with a third shaft or interconnecting member 340. The planet gears 314D are each configured to intermesh with both of the sun gear member 314A and the combination gear member 14B/16C.

The planetary gear set 316 includes the combination gear member 14B/16C, a ring gear member 316A, and a planet gear carrier member 316B that rotatably supports a set of planet gears 316D (only one of which is shown). As stated above, the combination gear member 14B/16C is connected for common rotation with the second shaft or interconnecting member 338. The ring gear member 316A is connected with a fourth shaft or interconnecting member 342. The planet carrier member 316B is connected for common rotation with the third shaft or interconnecting member 340. The planet gears 316D are each configured to intermesh with both of the combination gear member 14B/16C and the ring gear member 316A.

The planetary gear set 318 includes a sun gear member 318C, a ring gear member 318B, and a planet gear carrier member 318A that rotatably supports a set of planet gears 318D (only one of which is shown). The sun gear member 318C is connected for common rotation with a fifth shaft or interconnecting member 344. The ring gear member 318B is connected for common rotation with a sixth shaft or interconnecting member 346. The planet carrier member 318A is connected for common rotation with the output shaft or member 322. The planet gears 318D are each configured to intermesh with both of the sun gear member 318C and the ring gear member 3188.

The planetary gear set 320 includes a sun gear member 320B, a ring gear member 320A, and a planet gear carrier member 320C that rotatably supports a set of planet gears 320D (only one of which is shown). The sun gear member 320B is connected for common rotation with the fifth shaft or interconnecting member 344. The ring gear member 320A is connected for common rotation with the third shaft or interconnecting member 340. The planet carrier member 320C is connected for common rotation with the sixth shaft or interconnecting member 346. The planet gears 320D are each configured to intermesh with both of the sun gear member 320B and the ring gear member 320A.

The input shaft or member 312 is preferably continuously connected to an engine (not shown) or to a turbine of a torque converter (not shown). The output shaft or member 322 is preferably continuously connected with the final drive unit or transfer case (not shown).

The torque transmitting mechanisms or the brakes 324, 326, 328 and the clutches 330, 332, 334 allow for selective interconnection of the shafts or interconnecting members, members of the planetary gear sets and the housing. For example, the first brake 324 is selectively engageable to interconnect the first shaft or interconnecting member 336 with the stationary member or transmission housing 50. The second brake 326 is selectively engageable to interconnect fourth shaft or interconnecting member 342 with the stationary member or transmission housing 50. The third brake 328 is selectively engageable to interconnect sixth shaft or interconnecting member 346 with the stationary member or transmission housing 50. The first clutch 330 is selectively engageable to interconnect the fifth shaft or interconnecting member 344 with the input shaft or member 312. The second clutch 332 is selectively engageable to interconnect the sixth shaft or interconnecting member 346 with the input shaft or member 312. The third clutch 334 is selectively engageable to interconnect the second shaft or interconnecting member 338 with the input shaft or member 312.

Figures 12, 13:
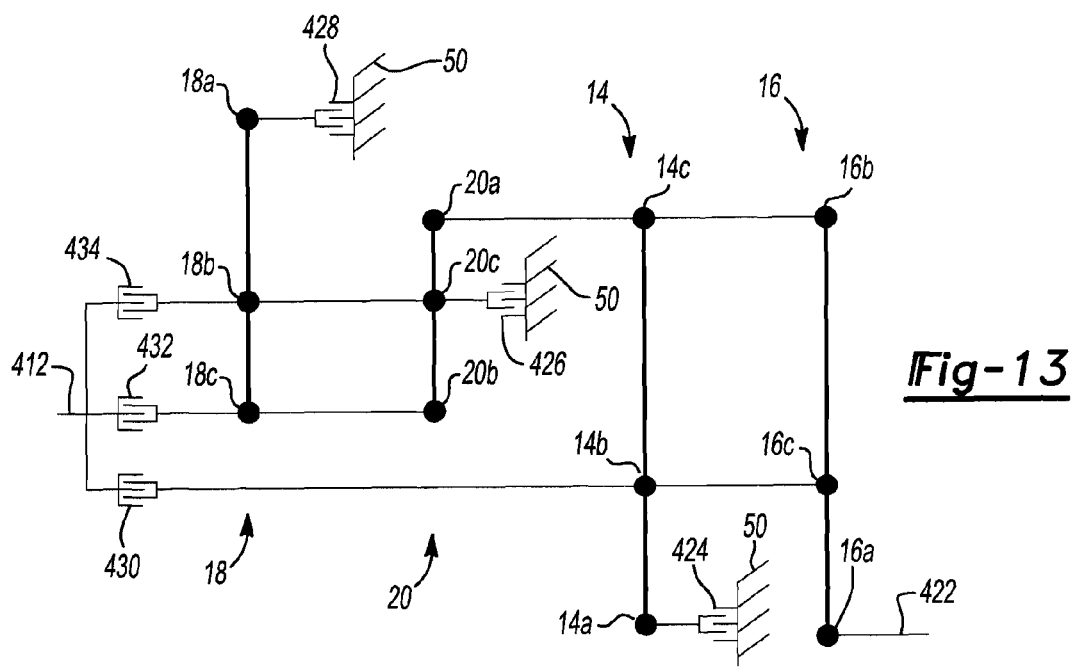
FIG. 12 is a truth table presenting the state of engagement of the various torque transmitting mechanisms in each of the available forward and reverse speeds or gear ratios of the transmission illustrated in FIGS. 10 and 11.
FIG. 13 is a lever diagram of an embodiment of an eight speed transmission according to the present invention.

Referring now to FIGS. 11 and 12, the operation of the embodiment of the eight speed transmission 310 will be described. It will be appreciated that the transmission 310 is capable of transmitting torque from the input shaft or member 312 to the output shaft or member 322 in at least eight forward speed or torque ratios and at least one reverse speed or torque ratio with a triple overdrive. Each forward and reverse speed or torque ratio is attained by engagement of one or more of the torque transmitting mechanisms (i.e. first brake 324, second brake 326, third brake 328, first clutch 330, second clutch 332, and third clutch 334), as will be explained below. FIG. 12 is a truth table presenting the various combinations of torque transmitting mechanisms that are activated or engaged to achieve the various gear states. Gear ratios are achievable depending on the gear diameter, gear teeth count and gear configuration selected.

To establish reverse gear, the second brake 326, the third brake 328 and the third clutch 334 are engaged or activated. The second brake 326 connects the fourth shaft or interconnecting member 342 with the stationary member or transmission housing 50 in order to prevent the fourth shaft or interconnecting member 342 and therefore the ring gear member 316A of the second planetary gear set 316 from rotating relative to the transmission housing 50. The third brake 328 connects the sixth shaft or interconnecting member 346 with the stationary member or transmission housing 50 in order to prevent the sixth shaft or interconnecting member 346 and therefore the ring gear member 3188 of the third planetary gear set 318 from rotating relative to the transmission housing 50. The third clutch 334 connects the second shaft or interconnecting member 338 with the input shaft or member 312. Likewise, the eight forward ratios are achieved through different combinations of clutch and brake engagement, as shown in FIG. 12.

It will be appreciated that the foregoing explanation of operation and gear states of the eight speed transmission 310 assumes, first of all, that all the clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

Referring now to FIG. 13, another example of the transmission 410 includes a first brake 424 selectively connecting the first node 14A of the first planetary gear set 14 with a stationary member 50. A second brake 426 selectively connects the second node 18B of the third planetary gear set 18 and the third node 20C of the fourth planetary gear set 20 with the stationary member 50. A third brake 428 selectively connects the first node 18A of the third planetary gear set 18 with a stationary member 50. A first clutch 430 selectively connects the third node 16C of the first planetary gear set 16 and the second node 14B of the first planetary gear set 14 with the input shaft or member 12. A second clutch 432 selectively connects the second node 20B of the fourth planetary gear set 20 and the third node 18C of the third planetary gear set 18 with the input shaft or member 12. A third clutch 434 selectively connects the third node 20C of the fourth planetary gear set 20 and the second node 18B of the third planetary gear set 18 with the input shaft or member 12. The output shaft or member 422 is coupled to the first node 16A of the second planetary gear set 16.

Figures 14, 15:
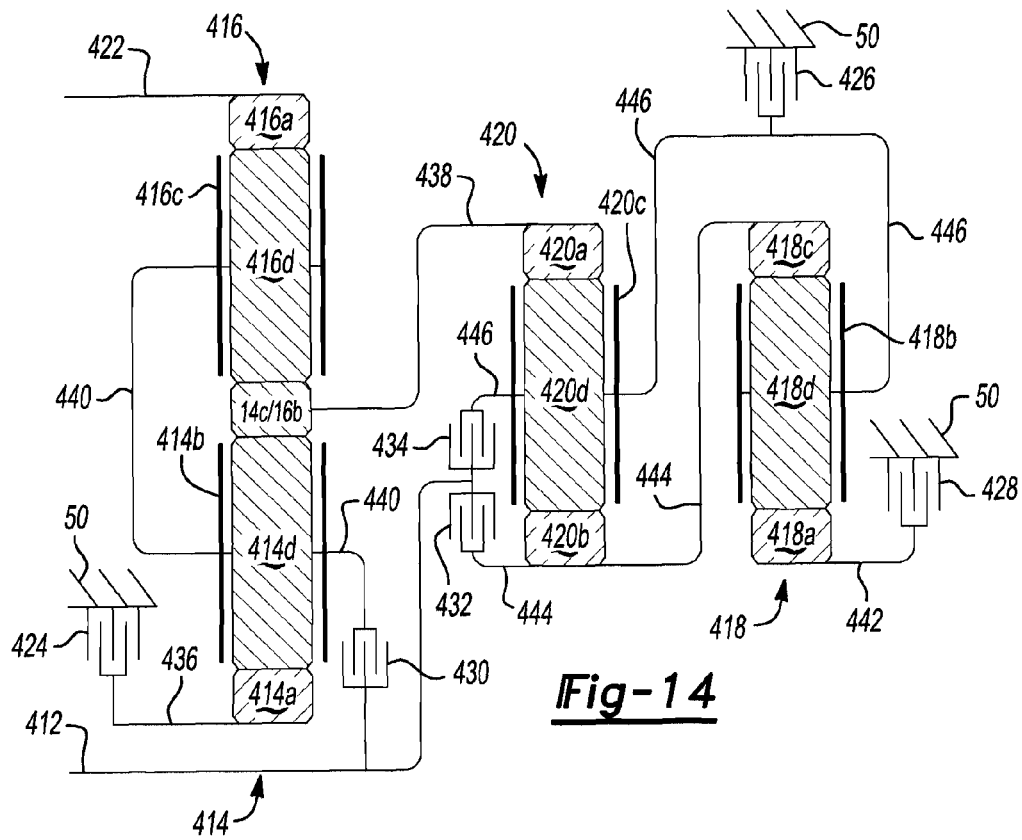
FIG. 14 is a diagrammatic view of an embodiment of a nine speed transmission according to the present invention.
FIG. 15 is a truth table presenting the state of engagement of the various torque transmitting mechanisms in each of the available forward and reverse speeds or gear ratios of the transmission illustrated in FIGS. 13 and 14.

Referring now to FIG. 14, a stick diagram presents a schematic layout of another example of the eight speed transmission 310 according to the present invention. The clutches, brakes, and couplings are correspondingly presented whereas the nodes of the planetary gear sets now appear as components of planetary gear sets such as sun gears, ring gears, planet gears and planet gear carriers.

For example, the planetary gear set 414 includes a sun gear member 414A, a combination gear member 14C/16B, and a planet gear carrier member 414B that rotatably supports a set of planet gears 414D (only one of which is shown). The combination gear member 14C/16B is employed as a ring gear member for the first planetary gear set 414 and a sun gear member for the second planetary gear set 416. The combination gear member 14A/16B combines the function of a ring gear member, a sun gear member and an interconnecting member. The sun gear member 414A is connected with a first shaft or interconnecting member 436. The combination gear member 14C/16B is connected for common rotation with a second shaft or interconnecting member 438. The carrier member 414B is connected for common rotation with a third shaft or interconnecting member 440. The planet gears 414D are each configured to intermesh with both of the sun gear member 414A and the combination gear member 14C/16B.

The planetary gear set 416 includes the combination gear member 14C/16B, a ring gear member 416A, and a planet gear carrier member 416C that rotatably supports a set of planet gears 416D (only one of which is shown). As stated above, the combination gear member 14C/16B is connected for common rotation with the second shaft or interconnecting member 438. The ring gear member 416A is connected for common rotation with the output shaft or member 422. The planet carrier member 416C is connected for common rotation with the third shaft or interconnecting member 440. The planet gears 416D are each configured to intermesh with both of the combination gear member 14C/16B and the ring gear member 416A.

The planetary gear set 418 includes a sun gear member 418A, a ring gear member 418C, and a planet gear carrier member 418B that rotatably supports a set of planet gears 418D (only one of which is shown). The sun gear member 418A is connected with the a fourth shaft or interconnecting member 442. The ring gear member 418C is connected for common rotation with a fifth shaft or interconnecting member 444. The planet carrier member 418B is connected for common rotation with a sixth shaft or interconnecting member 446. The planet gears 418D are each configured to intermesh with both of the sun gear member 418A and the ring gear member 418C.

The planetary gear set 420 includes a sun gear member 420B, a ring gear member 420A, and a planet gear carrier member 420C that rotatably supports a set of planet gears 420D (only one of which is shown). The sun gear member 420B is connected for common rotation with the fifth shaft or interconnecting member 444. The ring gear member 420A is connected for common rotation with the second shaft or interconnecting member 438. The planet carrier member 420C is connected for common rotation with the sixth shaft or interconnecting member 446. The planet gears 420D are each configured to intermesh with both of the sun gear member 420B and the ring gear member 420A.

The input shaft or member 412 is preferably continuously connected to an engine (not shown) or to a turbine of a torque converter (not shown). The output shaft or member 422 is preferably continuously connected with the final drive unit or transfer case (not shown).

The torque transmitting mechanisms or the brakes 424, 426, 428 and the clutches 430, 432, 434 allow for selective interconnection of the shafts or interconnecting members, members of the planetary gear sets and the housing. For example, the first brake 424 is selectively engageable to interconnect the first shaft or interconnecting member 436 with the stationary member or transmission housing 50. The second brake 426 is selectively engageable to interconnect the sixth shaft or interconnecting member 446 with the stationary member or transmission housing 50. The third brake 428 is selectively engageable to interconnect fourth shaft or interconnecting member 442 with the stationary member or transmission housing 50. The first clutch 430 is selectively engageable to interconnect third shaft or interconnecting member 440 with the input shaft or member 412. The second clutch 432 is selectively engageable to interconnect the fifth shaft or interconnecting member 444 with the input shaft or member 412. The third clutch 434 is selectively engageable to interconnect the sixth shaft or interconnecting member 446 with the input shaft or member 412.

Referring now to FIGS. 14 and 15, the operation of the embodiment of the ten speed transmission 410 will be described. It will be appreciated that the transmission 410 is capable of transmitting torque from the input shaft or member 412 to the output shaft or member 422 in at least eight forward speed or torque ratios and at least one reverse speed or torque ratio with a triple overdrive. Each forward and reverse speed or torque ratio is attained by engagement of one or more of the torque transmitting mechanisms (i.e. first brake 424, second brake 426, third brake 428, first clutch 430, second clutch 432, and third clutch 434), as will be explained below. FIG. 15 is a truth table presenting the various combinations of torque transmitting mechanisms that are activated or engaged to achieve the various gear states. Gear ratios are achievable depending on the gear diameter, gear teeth count and gear configuration selected.

To establish reverse gear, the first brake 424, the second brake 426 and the third clutch 434 are engaged or activated. The first brake 424 connects the first shaft or interconnecting member 436 with the stationary member or transmission housing 50 in order to prevent the first shaft or interconnecting member 436 and therefore the sun gear 414A of the first planetary gear set 414 from rotating relative to the transmission housing 50. The second brake 426 connects the sixth shaft or interconnecting member 446 with the stationary member or transmission housing 50 in order to prevent the sixth shaft or interconnecting member 446 and therefore the carrier member 418B of the third planetary gear set 418 and the planet carrier 420C of the fourth planetary gear set 420 from rotating relative to the transmission housing 50. The third clutch 434 connects the sixth shaft or interconnecting member 446 with the input shaft or member 12. Likewise, the eight forward ratios are achieved through different combinations of clutch and brake engagement, as shown in FIG. 15.

It will be appreciated that the foregoing explanation of operation and gear states of the eight speed transmission 410 assumes, first of all, that all the clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission comprising:
an input member; an output member; first, second, third and fourth planetary gear sets each having first, second and third members, and wherein the output member is directly connected with the first member of the second planetary gear set; a first interconnecting member continuously interconnecting the second member of the first planetary gear set directly with the third member of the second planetary gear set; a second interconnecting member continuously interconnecting the third member of the first planetary gear set directly with the second member of the second planetary gear set; a third interconnecting member continuously interconnecting the second member of the second planetary gear set directly with the first member of the fourth planetary gear set; a fourth interconnecting member continuously interconnecting the second member of the third planetary gear set directly with the third member of the fourth planetary gear set;
a fifth interconnecting member continuously interconnecting the third member of the third planetary gear set directly with the second member of the fourth planetary gear set; and six torque transmitting mechanisms each selectively engageable to interconnect a respective one of the first members, second members, and third members of the first, second, third, and fourth planetary gear sets directly with another respective one of the first members, second members, and third members of the first, second, third, and fourth planetary gear sets, or a stationary member, and wherein the torque transmitting mechanisms are selectively engageable in combinations of at least three to establish at least eight forward speed ratios and at least one reverse speed ratio between the input member and the output member.

2. The transmission of claim 1 wherein a first of the six torque transmitting mechanisms is selectively engageable to interconnect the first member of the first planetary gear set with a stationary member.

3. The transmission of claim 2 wherein a second of the six torque transmitting mechanisms is selectively engageable to interconnect at least one of the second member of the third planetary gear set and the third member of the fourth planetary gear set with the stationary member.

4. The transmission of claim 3 wherein a third of the six torque transmitting mechanisms is selectively engageable to interconnect at least one of the second member of the first planetary gear set and the third member of the second planetary gear set with the input member.

5. The transmission of claim 4 wherein a fourth of the six torque transmitting mechanisms is selectively engageable to interconnect at least one of the second member of the third planetary gear set and the third member of the fourth planetary gear set with the input member.

6. The transmission of claim 5 wherein a fifth of the six torque transmitting mechanisms is selectively engageable to interconnect at least one of the third member of the third planetary gear set and the second member of the fourth planetary gear set with the stationary member.

7. The transmission of claim 6 wherein a sixth of the six torque transmitting mechanisms is selectively engageable to interconnect the first member of the third planetary gear set with the input member.

8. The transmission of claim 5 wherein a fifth of the six torque transmitting mechanisms is selectively engageable to interconnect at least one of the third member of the third planetary gear set and the second member of the fourth planetary gear set with the input member.

9. The transmission of claim 8 wherein a sixth of the six torque transmitting mechanisms is selectively engageable to interconnect the first member of the third planetary gear set with the stationary member.

10. A transmission comprising:
an input member;
an output member;
first, second, third and fourth planetary gear sets each having first, second and third members, and wherein the output member is directly connected to the first member of the second planetary gear set;
a first interconnecting member continuously interconnecting the second member of the first planetary gear set directly with the third member of the second planetary gear set; a second interconnecting member continuously interconnecting the third member of the first planetary gear set directly with the second member of the second planetary gear set; a third interconnecting member continuously interconnecting the second member of the second planetary gear set directly with the first member of the fourth planetary gear set; a fourth interconnecting member continuously interconnecting the second member of the third planetary gear set directly with the third member of the fourth planetary gear set; a fifth interconnecting member continuously interconnecting the third member of the third planetary gear set directly with the second member of the fourth planetary gear set;
six torque transmitting mechanisms each selectively engageable to interconnect a respective one of the first members, second members, and third members of the first, second, third, and fourth planetary gear sets with another respective one of the first members, second members, and third members of the first, second, third, and fourth planetary gear sets, or a stationary member, and wherein the torque transmitting mechanisms are selectively engageable in combinations of at least three to establish at least eight forward speed ratios and at least one reverse speed ratio between the input member and the output member, a first of the six torque transmitting mechanisms is selectively engageable to interconnect the first member of the first planetary gear set directly with a stationary member, a second of the six torque transmitting mechanisms is selectively engageable to interconnect at least one of the second member of the third planetary gear set and the third member of the fourth planetary gear set directly with the stationary member, a third of the six torque transmitting mechanisms is selectively engageable to interconnect at least one of the second member of the first planetary gear set and the third member of the second planetary gear set directly with the input member, and a fourth of the six torque transmitting mechanisms is selectively engageable to interconnect at least one of the second member of the third planetary gear set and the third member of the fourth planetary gear set directly with the input member.

11. The transmission of claim 10 wherein a fifth of the six torque transmitting mechanisms is selectively engageable to interconnect at least one of the third member of the third planetary gear set and the second member of the fourth planetary gear set with the stationary member.

12. The transmission of claim 11 wherein a sixth of the six torque transmitting mechanisms is selectively engageable to interconnect the first member of the third planetary gear set with the input member.

13. The transmission of claim 10 wherein a fifth of the six torque transmitting mechanisms is selectively engageable to interconnect at least one of the third member of the third planetary gear set and the second member of the fourth planetary gear set with the input member.

14. The transmission of claim 13 wherein a sixth of the six torque transmitting mechanisms is selectively engageable to interconnect the first member of the third planetary gear set with the stationary member.

15. A transmission comprising:
an input member;
an output member;
first, second, third and fourth planetary gear sets each having first, second and third members, and wherein the output member is directly connected to the first member of the second planetary gear set;
five interconnecting members each connecting for common rotation one of the first members, second members, and third members of the planetary gear sets with another of the first members, second members, third members of the planetary gear sets;
six torque transmitting mechanisms each selectively engageable to interconnect a respective one of the first members, second members, and third members of the first, second, third, and fourth planetary gear sets with another respective one of the first members, second members, and third members of the first, second, third, and fourth planetary gear sets, or a stationary member, and wherein the torque transmitting mechanisms are selectively engageable in combinations of at least three to establish at least eight forward speed ratios and at least one reverse speed ratio between the input member and the output member, a first of the five interconnecting members continuously interconnects the second member of the first planetary gear set with the third member of the second planetary gear set, a second of the five interconnecting members continuously interconnects the third member of the first planetary gear set directly with the second member of the second planetary gear set, a third of the five interconnecting members continuously interconnects the second member of the second planetary gear set directly with the first member of the fourth planetary gear set, a fourth of the five interconnecting members continuously interconnects the second member of the third planetary gear set directly with the third member of the fourth planetary gear set, a first of the six torque transmitting mechanisms is selectively engageable to interconnect the first member of the first planetary gear set with a stationary member, and a second of the six torque transmitting mechanisms is selectively engageable to interconnect at least one of the second member of the first planetary gear set and the third member of the second planetary gear set with the input member.

16. The transmission of claim 15 wherein a fifth of the five interconnecting members is continuously interconnecting the third member of the third planetary gear set with the second member of the fourth planetary gear set.

17. The transmission of claim 16 wherein a fifth of the six torque transmitting mechanisms is selectively engageable to interconnect at least one of the third member of the third planetary gear set and the second member of the fourth planetary gear set with the input member.

18. The transmission of claim 17 wherein a sixth of the six torque transmitting mechanisms is selectively engageable to interconnect the first member of the third planetary gear set with the stationary member.

19. The transmission of claim 15 wherein a third of the six torque transmitting mechanisms is selectively engageable to interconnect at least one of the second member of the third planetary gear set and the third member of the fourth planetary gear set with the stationary member.

20. The transmission of claim 19 wherein a fourth of the six torque transmitting mechanisms is selectively engageable to interconnect at least one of the second member of the third planetary gear set and the third member of the fourth planetary gear set with the input member.

21. The transmission of claim 20 wherein a fifth of the six torque transmitting mechanisms is selectively engageable to interconnect at least one of the third member of the third planetary gear set and the second member of the fourth planetary gear set with the stationary member.

22. The transmission of claim 21 wherein a sixth of the six torque transmitting mechanisms is selectively engageable to interconnect the first member of the third planetary gear set with the input member.

* * * * *